(12) United States Patent
Nguyen et al.

(10) Patent No.: US 12,362,696 B2
(45) Date of Patent: Jul. 15, 2025

(54) ELECTRIC MOTOR CONTROL

(71) Applicant: GM GLOBAL TECHNOLOGY OPERATIONS LLC, Detroit, MI (US)

(72) Inventors: Minh-Khai Nguyen, Troy, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 184 days.

(21) Appl. No.: 18/479,989

(22) Filed: Oct. 3, 2023

(65) Prior Publication Data

US 2025/0112578 A1 Apr. 3, 2025

(51) Int. Cl.
*H02P 27/08* (2006.01)
*B60L 15/00* (2006.01)
*B60L 50/51* (2019.01)
*H02P 21/14* (2016.01)

(52) U.S. Cl.
CPC ............ *H02P 27/08* (2013.01); *B60L 15/007* (2013.01); *B60L 50/51* (2019.02); *H02P 21/14* (2013.01); *B60L 2210/42* (2013.01)

(58) Field of Classification Search
CPC ...... H02P 21/00; H02P 21/0085; H02P 21/04; H02P 21/14; H02P 21/22; H02P 23/00; H02P 23/07; H02P 23/14; H02P 25/00; H02P 25/03; H02P 25/062; H02P 25/064; H02P 25/107; H02P 27/00; H02P 27/04; H02P 27/06; H02P 27/08; H02P 27/12; H02P 1/24; H02P 1/42; H02P 1/46; H02P 25/22; H02P 29/40; H02P 5/74; H02P 27/085; B60L 2200/26; B60L 15/025; B60L 2200/40; B60L 2210/20; B60L 2210/40; B60L 2210/46; B60L 2220/58; (Continued)

(56) References Cited

U.S. PATENT DOCUMENTS

2020/0106432 A1   4/2020   Wang et al.
2025/0088122 A1*  3/2025   Zhang ............... H02M 7/53871

OTHER PUBLICATIONS

S.M. Dabour, S.M. Abdel-Wahab, and E.M. Rashad; "Common-Mode Voltage Reduction Algorithm with Minimum Switching Losses for Three-Phase Inverters"; paper presented at the 21st International Middle East Power Systems Conference; 2019; Tanta University, Egypt; pp. 1210-1215.

(Continued)

*Primary Examiner* — Antony M Paul
(74) *Attorney, Agent, or Firm* — Quinn IP Law

(57) ABSTRACT

A method for control of an alternating current (AC) electric motor through a voltage inverter having a plurality of electric switches with on-off states that collectively define a plurality of non-zero vectors angularly disposed about a common origin includes through one or more controllers, calculating a rotating voltage reference vector to apply to the AC electric motor through the voltage inverter. The method also includes through one or more controllers, calculating voltage inverter switching times using a first subset of the plurality of non-zero vectors, the first subset including fewer than all of the plurality of non-zero vectors and including no adjacent non-zero vectors, to synthesize the rotating voltage reference vector. Additionally, the method includes through the voltage inverter, applying the rotating voltage reference vector to the AC electric motor.

19 Claims, 6 Drawing Sheets

(58) Field of Classification Search
CPC .. B60L 3/0046; B60L 50/51; H02M 7/53876; H02M 7/5395
See application file for complete search history.

(56) References Cited

OTHER PUBLICATIONS

R.Chen, J. Niu, H. Gui et al.; "Harmonic Analysis of Common-mode Reduction Modulation for Three-level Inverter"; paper; 2019 IEEE; pp. 2286 to 2293.
Emre Un and Ahmet M. Hava; "Performance Analysis and Comparison of Reduced Common Mode Voltage PWM and Standard PWM Techniques for Three-Phase Voltage Source Inverters"; paper; Ankara, Turkey; 2006 IEEE; pp. 1210-1215.

* cited by examiner

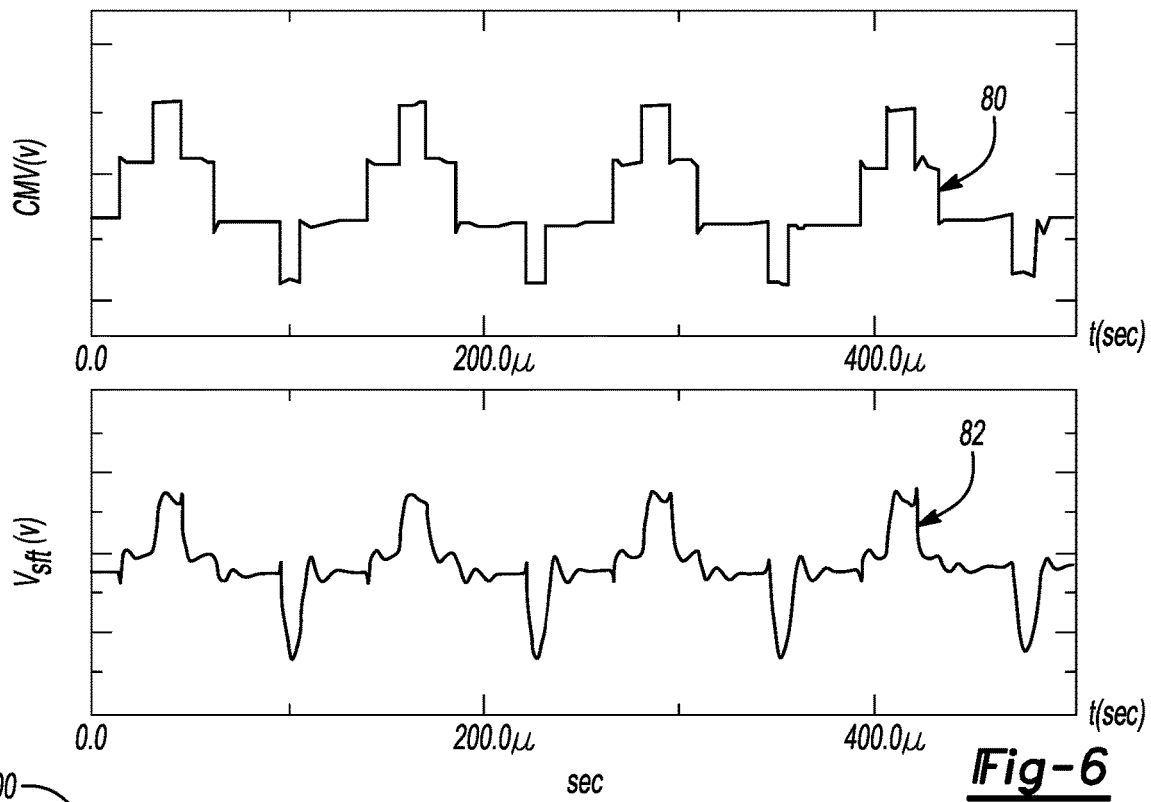
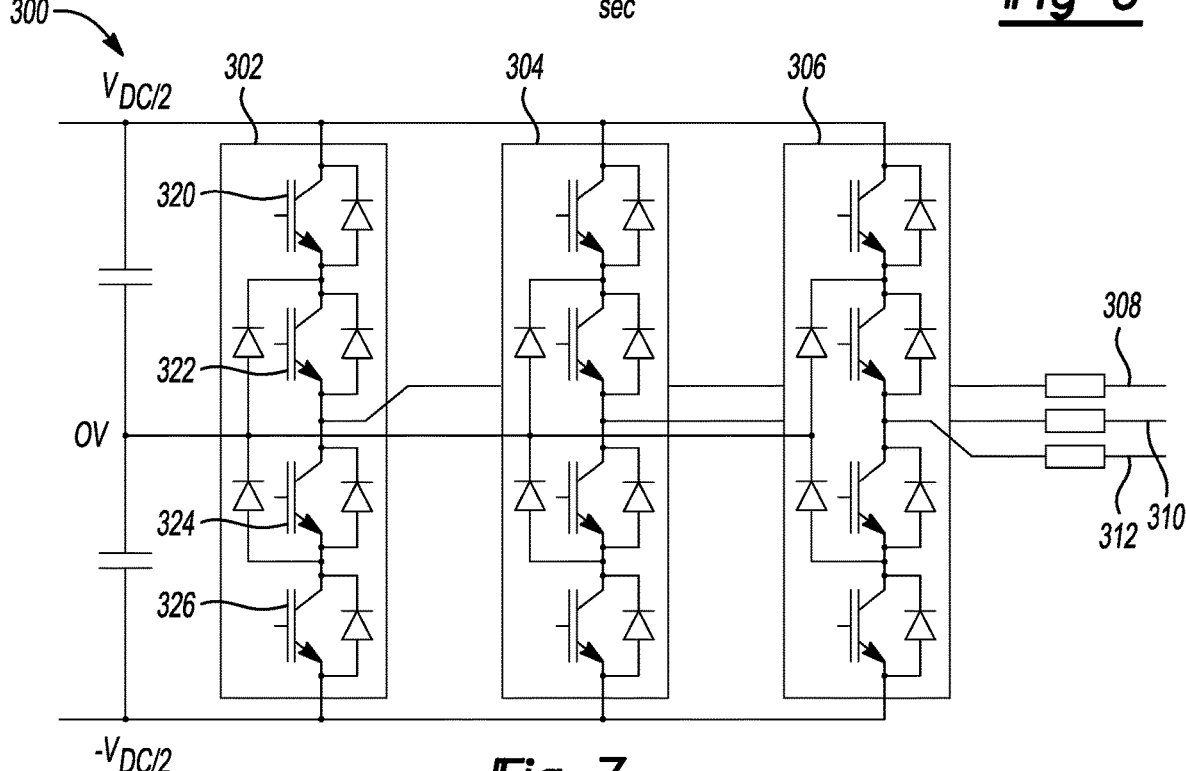
Fig-6
Fig-7

ELECTRIC MOTOR CONTROL

INTRODUCTION

The present disclosure is in the field of electric motor control.

Electric motors are used in many applications, including to generate tractive power for propelling electric vehicles. In control of an alternating current electric motor, particularly a high-voltage electric motor, significant unintended leakage currents generated during operation of the motor may reduce the efficiency of the motor. Further, unintended leakage currents may travel through various components of the motor, such as the bearings thereof, which may affect durability of the motor. A motor control method that reduces unintended leakage currents may therefore be advantageous.

SUMMARY

A method for control of an AC (alternating current) electric motor through a voltage inverter having a plurality of electric switches with on-off states that collectively define a plurality of non-zero vectors angularly disposed about a common origin includes through one or more controllers, calculating a rotating voltage reference vector to apply to the AC electric motor through the voltage inverter. The method also includes through one or more controllers, calculating switching times for the voltage inverter using a first subset of the plurality of non-zero vectors, the first subset including fewer than all of the plurality of non-zero vectors and including no adjacent non-zero vectors, to synthesize the rotating voltage reference vector. Additionally, the method includes through the voltage inverter, applying the rotating voltage reference vector to the AC electric motor.

As an additional feature, the method may further include through one or more controllers, calculating switching times for the voltage inverter using a second subset of the plurality of non-zero vectors, the second subset including fewer than all of the plurality of non-zero vectors and including no adjacent non-zero vectors, to synthesize the rotating voltage reference vector, wherein the second subset of the plurality of non-zero vectors is different than the first subset of non-zero vectors and through the voltage inverter, applying the rotating voltage reference vector to the AC electric motor. The first subset of the plurality of non-zero vectors and the second subset of the plurality of non-zero vectors may have no common members.

The AC electric motor may be a three-phase electric motor, and the voltage inverter may be an H-bridge two-level voltage inverter with six electric switches and six non-zero vectors. Alternatively, the voltage inverter may be a multi-level voltage inverter with 24 non-zero vectors.

Further, applying the rotating voltage reference vector to the AC electric motor may include applying the voltage reference vector by pulse-width modulation, and the pulse-width modulation may be state vector pulse-width modulation.

As an alternative, each non-zero vector in the first subset of the plurality of non-zero vectors may result in a first resultant voltage at a neutral point of the AC electric motor. As yet another alternative, each non-zero vector in the second subset of the plurality of non-zero vectors may result in a second resultant voltage at the neutral point of the AC electric motor. The first resultant voltage may be different than the second resultant voltage. The method may also include changing from using the first subset of non-zero vectors to using the second subset of the plurality of non-zero vectors in response to a voltage of a shaft of a rotor of the AC electric motor.

A second method for control of an AC electric motor through a voltage inverter having a plurality of electric switches with on-off states that collectively define a plurality of non-zero basic vectors angularly disposed about a common origin includes through one or more controllers, calculating a rotating state vector to apply to the AC motor through the voltage inverter. The method further includes through one or more controllers, controlling switching of the voltage inverter using a first subset of the plurality of non-zero basic vectors, the first subset including fewer than all of the plurality of non-zero basic vectors and including no adjacent non-zero basic vectors, to synthesize the rotating state vector. Yet further, the method includes, through the voltage inverter, applying the rotating state vector to the AC electric motor by pulse-width modulation.

The method may additionally include through one or more controllers, controlling switching of the voltage inverter using a second subset of the plurality of non-zero basic vectors, the second subset including fewer than all of the plurality of non-zero basic vectors and including no adjacent non-zero basic vectors, to synthesize the rotating state vector, wherein the second subset of the plurality of non-zero basic vectors is different than the first subset of non-zero basic vectors, and through the voltage inverter, applying the rotating state vector to the AC electric motor by pulse-width modulation. The first subset of the plurality of non-zero vectors and the second subset of the plurality of non-zero vectors may have no common members.

Further, the method may include through one or more controllers, calculating voltage inverter switching times using all of the non-zero basic vectors to synthesize the rotating state vector, and through the voltage inverter, applying the rotating state vector to the AC electric motor by pulse-width modulation. The first subset of non-zero basic vectors may be used in a first AC electric motor operating condition and all of the non-zero basic vectors may be used in a second AC electric motor operating condition. The first AC electric motor operating condition may be a lower motor speed or lower motor torque condition than the second AC electric motor operating condition.

In the method for controlling an AC electric motor, each non-zero vector in the first subset of the plurality of non-zero vectors may in a first resultant voltage at a neutral point of the AC electric motor and each non-zero vector in the second subset of the plurality of non-zero vectors may result in a second resultant voltage at the neutral point of the AC electric motor. The first resultant voltage may be different than the second resultant voltage. Additionally, using the first subset of non-zero vectors may be changed to using the second subset of the plurality of non-zero vectors in response to a voltage of a shaft of a rotor of the AC electric motor.

A motor vehicle includes a source of stored electrical energy and an AC electric motor. The motor vehicle also includes a voltage inverter coupled to the source of stored electrical energy and the AC electric motor to provide switched electrical energy from the source of stored electrical energy to the AC electric motor, the voltage inverter having a plurality of electric switches with on-off states that collectively define a plurality of non-zero vectors angularly disposed about a common origin. The motor vehicle additionally includes one or more controllers. The one or more controllers are collectively programmed with the following instructions: calculate a rotating voltage reference vector to apply to the AC electric motor through the voltage inverter; calculate switching times for the voltage inverter using a first subset of the plurality of non-zero vectors, the first subset including fewer than all of the plurality of non-zero vectors and including no adjacent non-zero vectors, to synthesize the rotating voltage reference vector; and through the voltage inverter, apply the rotating voltage reference vector to the AC electric motor.

The one or more controllers may additionally be collectively programmed with the following instructions: through one or more controllers, calculate switching times for the voltage inverter using a second subset of the plurality of non-zero vectors, the second subset including fewer than all of the plurality of non-zero vectors and including no adjacent non-zero vectors, to synthesize the rotating voltage reference vector, wherein the second subset of the plurality of non-zero vectors is different than the first subset of non-zero vectors; and through the voltage inverter, apply the rotating voltage reference vector to the AC electric motor.

The first subset of the plurality of non-zero vectors and the second subset of the plurality of non-zero vectors may have no common members. Each non-zero vector in the first subset of the plurality of non-zero vectors may result in a first resultant voltage at a neutral point of the AC electric motor and each non-zero vector in the second subset of the plurality of non-zero vectors may result in a second resultant voltage at the neutral point of the AC electric motor. The first resultant voltage may be different than the second resultant voltage.

The one or more controllers may be further programmed with the instruction to change from using the first subset of non-zero vectors to using the second subset of the plurality of non-zero vectors in response to a voltage of a shaft of a rotor of the AC electric motor.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIG. 6 illustrates switching voltage associated with a voltage inverter and a resultant waveform of induced voltage on a shaft of an electric motor coupled to the voltage inverter.

FIG. 7 illustrates a multi-level inverter.

DETAILED DESCRIPTION

Figure 1:
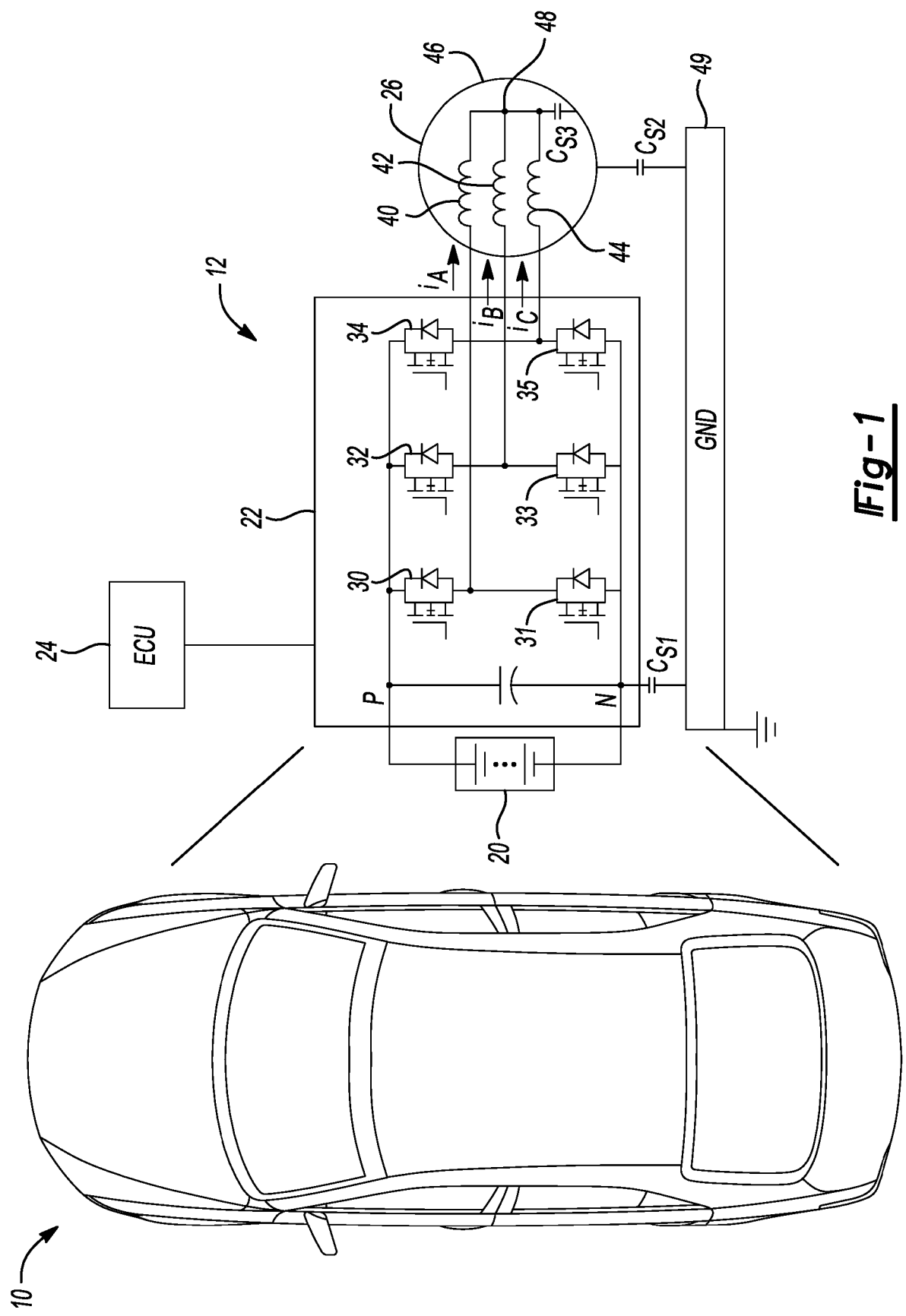
FIG. 1 shows a motor vehicle and an electric motor control system therefor.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring first to FIG. 1, a motor control system 12 is illustrated. Motor control system 12 may be for an electric vehicle 10. Motor control system 12 may, include a traction battery 20, a power inverter module (PIM) 22, an electronic control unit (ECU) 24 and an electric motor 26. Traction battery 20 may comprise one or more batteries or battery cells. Electric vehicle 10 may be a vehicle that uses an electric motor for at least part of the vehicle's propulsion and may be a full-electric or hybrid-electric vehicle. Further, electric vehicle 10 may be any style of vehicle, such as a car, truck, sport utility vehicle, motorcycle, bicycle, all-terrain vehicle, etc. Electric motor 26 may be a motor that provides tractive power for propulsion of electric vehicle 10.

Power inverter module 22 may include six switching elements, switching element 30, switching element 31, switching element 32, switching element 33, switching element 34 and switching element 35. The switching elements may be of various technologies for the purpose of this disclosure, including insulated gate bipolar transistors (IGBTs) and field-effect transistors (FETs). Switching element 30, switching element 31, switching element 32, switching element 33, switching element 34 and switching element 35 may also be collectively referred to hereinafter as switching elements 30-35.

Electronic control unit 24 may control the switching of switching elements 30-35 for the purpose of controlling and providing voltage to electric motor 26. Electronic control unit 24 is understood to have suitable electronic resources (microprocessor, software, memory, inputs, outputs, and the like) to perform the functions ascribed to electronic control unit 24 herein. Electronic control unit 24 may be a standalone controller, may be integrated with power inverter module 22, or may be integrated with other controllers on electric vehicle 10 that contains motor control system 12. Electronic control unit 24 may also be networked with other controllers and share responsibility for performing the functions laid out herein.

Electric motor 26 may by an alternating current (AC) motor. Electric motor 26 may be, for instance, a permanent magnet motor (and, further, a permanent magnet synchronous motor) or an induction motor. For simplicity, electric motor 26 is represented in FIG. 1 by its stator windings, stator winding 40, stator winding 42 and stator winding 44, with the rotor of electric motor 26 omitted in FIG. 1. The stator windings may be connected together at a neutral point 48. Electric motor 26 may have a conductive housing 46.

Various leakage capacitances may exist in the motor control system illustrated in FIG. 1, including leakage capacitance $C_{S1}$ between the negative rail N of power inverter module 22 and ground 49 (GND), leakage capacitance $C_{S2}$ between housing 46 of electric motor 26 and ground 49 and leakage capacitance $C_{S3}$ between neutral point 48 of the stator windings of electric motor 26 and housing 46 of electric motor 26.

Electric motor 26 may be controlled by so-called field-oriented control (FOC). In FOC, currents into the stator windings of electric motor 26 are resolved into two orthogonal currents, a flux-inducing component $i_d$ and a torque-inducing component $i_q$, which form the basis for the signals provided for commanding electric motor 26. In connection with FOC and otherwise, the so-called Clarke transformation may be used in order to simplify multi-phase quantities in a balanced three-phase system into two-dimensional quantities in the α-β domain.

In an implementation of FOC control, a rotating voltage reference vector in the α-β domain may calculated at high speed (that is, much higher than the speed at which the electric motor operates) for providing three phase voltage to an electric motor for generation of the desired mechanical output (torque/speed) from the electric motor. This rotating voltage reference may be applied by power inverter module 22 to electric motor 26, such as by pulse-width modulation (PWM), including state vector PWM (SVPWM), where the rotating voltage reference vector may be called a "state vector".

Figure 2:
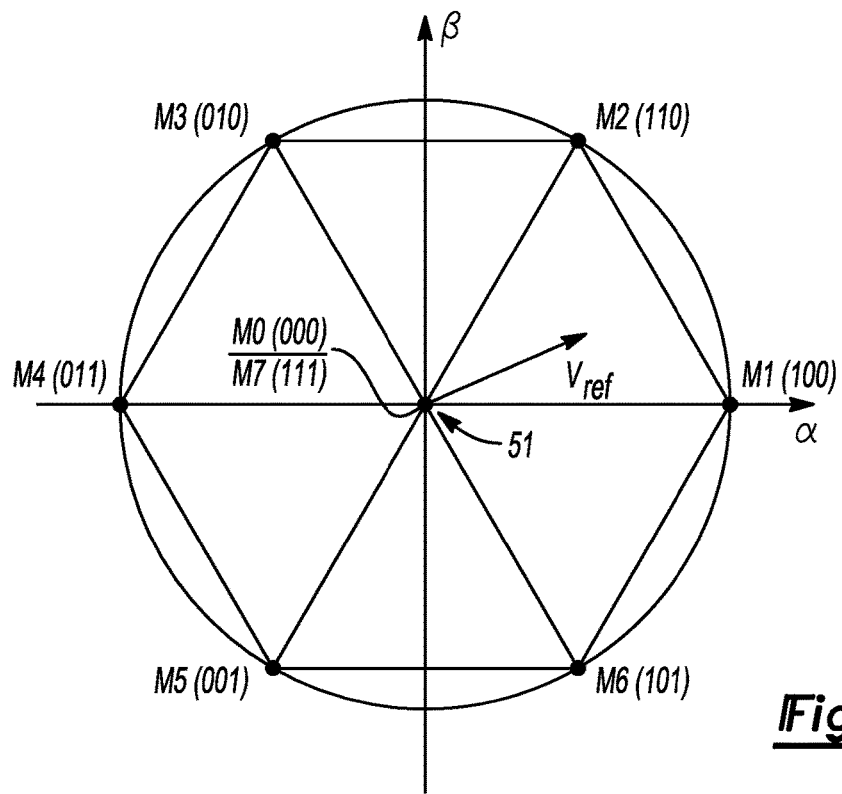
FIG. 2 is a vector diagram representative of a control mode for an electric motor.

FIG. 2 describes an implementation of SVPWM. SVPWM may operate under the assumption that in any leg of power inverter module 22 (say, the leftmost leg comprising switching element 30 and switching element 31, the center leg comprising switching element 32 and switching element 33, or the rightmost leg comprising switching element 34 and switching element 35), the switching elements have complementary states (that is, one switching element closed and one switching element open). Under that assumption, there are eight states, defining eight vectors, in which switching elements 30-35 may collectively be.

The eight vectors may be designated by three binary digits for convenience. The first digit may identify the state ("1"=closed, "0"=open) of switching element 30, the upper switching element in the leftmost leg of power inverter module 22. When switching element 30 is closed, switching element 31 is therefore open. The second binary digit may identify the state ("1"=closed, "0"=open) of switching element 32, the upper switching element in the center leg of power inverter module 22. When switching element 32 is closed, switching element 33 is therefore open. The third digit may identify the state of switching element 34, the upper switching element In the rightmost leg of power inverter module 22. When switching element 34 is closed, switching element 35 is therefore open (recalling that any two switching elements in a leg of power inverter module have complementary states).

The eight distinct vectors of switching elements 30-35 of power inverter module 22 are accordingly illustrated with reference to the following table:

| Vector | Inverter Switching States | CMV Value |
| --- | --- | --- |
| M0 | 000 | 0 |
| M1 | 100 | $V_{PN}/3$ |
| M2 | 110 | $2V_{PN}/3$ |
| M3 | 010 | $V_{PN}/3$ |
| M4 | 011 | $2V_{PN}/3$ |
| M5 | 001 | $V_{PN}/3$ |
| M6 | 101 | $2V_{PN}/3$ |
| M7 | 111 | $V_{PN}$ |

Vectors M0 through M7 may be referred to as "basic" vectors. Vectors M1-M6 may be referred to as "non-zero" vectors, given that they have magnitudes greater than zero. Vectors M0 and M7 may be referred to as "zero" vectors, given that they have zero magnitude (that is, they reside at the origin of the α-β plane. Vectors M1-M6 may be described as "angularly disposed" about a common origin 51 in the α-β plane.

A vector designated M0 (000) may represent all of the upper switching elements, that is, switching element 30, switching element 32, and switching element 34, being open. A vector designated M7 (111) may represent all of the upper switching elements, that is, switching element 30, switching element 32 and switching element 34, being closed. Vectors M1 through M6 may represent vectors in which one or two of switching element 30, switching element 32 and switching element 34, that is, the upper switching elements in power inverter module 22, are closed.

Continuing to refer to the above table, the resultant common mode voltages (CMVs) at neutral point 48 of electric motor 26 and associated with vector M0 through vector M7 are shown. For vector M0 the resultant CMV at neutral point 48 is zero as all of switching element 30 switching element 32 and switching element 34, the switching elements coupled to the positive rail P, are open and all of switching element 31, switching element 33 and switching element 35, the switching elements coupled to the negative rail N, are closed. For vector M7, the resultant CMV at neutral point 48, is $V_{PN}$, the voltage between positive rail P and negative rail N, as all of the upper switching elements are closed (that is, connected to positive rail P) and all of the lower switching elements are open.

For vector M1, switching element 30, switching element 33 and switching element 35 are open. Accordingly, the resultant CMV at neutral point 48 of electric motor 26 is $V_{PN}/3$, where $V_{PN}$ is the DC voltage between positive rail P and negative rail N of traction battery 20 and power inverter module 22. The resultant CMV at neutral point 48 is also $V_{PN}/3$ for vector M3 and vector M5, where one upper switching element (switching element 32 and switching element 34, respectively) is closed.

For vector M2, switching element 30, switching element 32 and switching element 35 are closed. Accordingly, the resultant CMV at neutral point 48 of electric motor 26 is $2V_{PN}/3$. The same is true for vector M4 and vector M6.

Unintended leakage current generated in electric motor 26 may be attributable to and a function of the time rate of change of CMV of electric motor 26. This may be illustrated by the fact that for capacitor, current i through the capacitor is i=Cdv/dt, where C is the capacitance and dv/dt is the time rate of change of voltage across the capacitance. Therefore, reducing the time rate of change of voltage across a capacitor will reduce the current therethrough.

As an example of SVPWM modulation, consider that $V_{ref}$, the rotating voltage reference vector to be applied to electric motor 26 by power inverter module 22, is in the position in the α-β plane shown in FIG. 2. To create that voltage vector, a combination of vector M1, vector M2 and vector M0 and/or vector M7 may be used. During the PWM duty cycle, sufficient fractions of the period of the carrier signal may apply M1, M2, and M0 and/or M7 to result in the vector sum (magnitude and direction) being the $V_{ref}$ vector. However, that case, the resultant CMV at neutral point 48 of electric motor 26 will change significantly between vectors M1 and M2, namely, between $V_{PN}/3$ and $2V_{PN}/3$. This will tend to cause a dv/dt in the CMV that results in leakage current.

Figure 3:
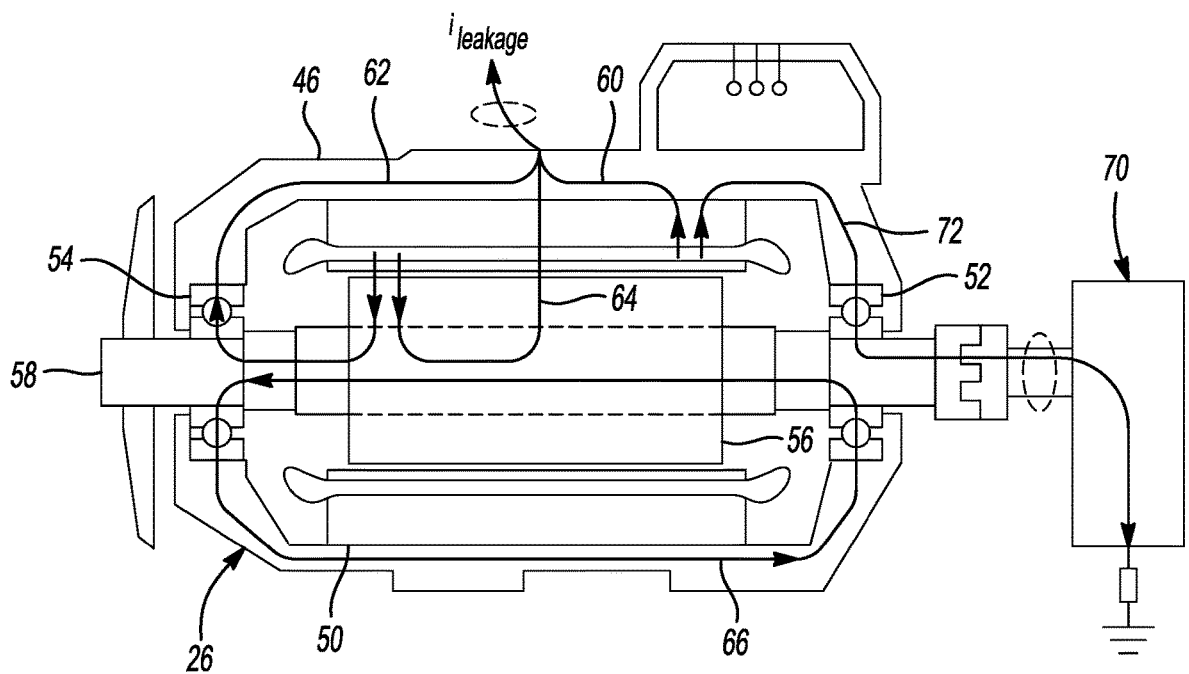
FIG. 3 shows a cross section of the electric motor of FIG. 1 and certain electric currents associated with the electric motor.

Refer additionally to FIG. 3. There, stator 50 and a rotor 56 are illustrated, along with housing 46 of electric motor 26 and bearing 52 and bearing 54 of electric motor 26. Rotor 56 is mounted on a shaft 58 for rotation therewith. Also shown schematically is a gear case 70. the gears of which may be driven by electric motor 26. Various currents resulting from dv/dt in CMV are shown, including leakage current 60, leakage current 62 and leakage current 64 (collectively resulting in a leakage current $i_{leakage}$, along with circulating current 66.

Figure 4:
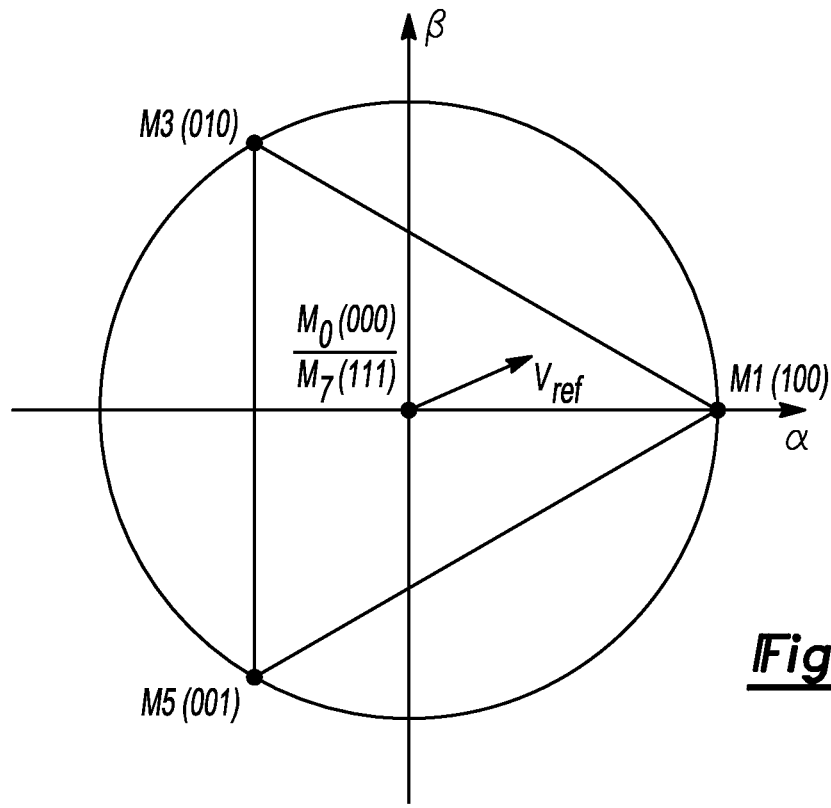
FIG. 4 shows a vector diagram representative of an alternative control mode for an electric motor.

However, consider an alternative control strategy as illustrated in FIG. 4. In that control strategy, the use of vectors M2, M4, and M6 may be omitted. Voltage reference vector $V_{ref}$ may be generated as a vector sum using only vector M1, vector M3, and vector M5. Recall from the table above that in each of vector M1, vector M3, and vector M5, the resultant common mode voltage (CMV) at neutral point 48 of electric motor 26 is $V_{PN}/3$. As such, using only vector M1, vector M3, and vector M5 will reduce or eliminate the rate of change of the CMV of electric motor 26 and the resulting i=Cdv/dt current associated with the time rate of change of CMV. It is apparent from FIG. 4 that vector M1, vector M3, and vector M5, nonadjacent non-zero vectors due to the omission of vector M2, vector M4, and vector M6, are being used. In other words, no adjacent non-zero vectors are used.

Figure 5:
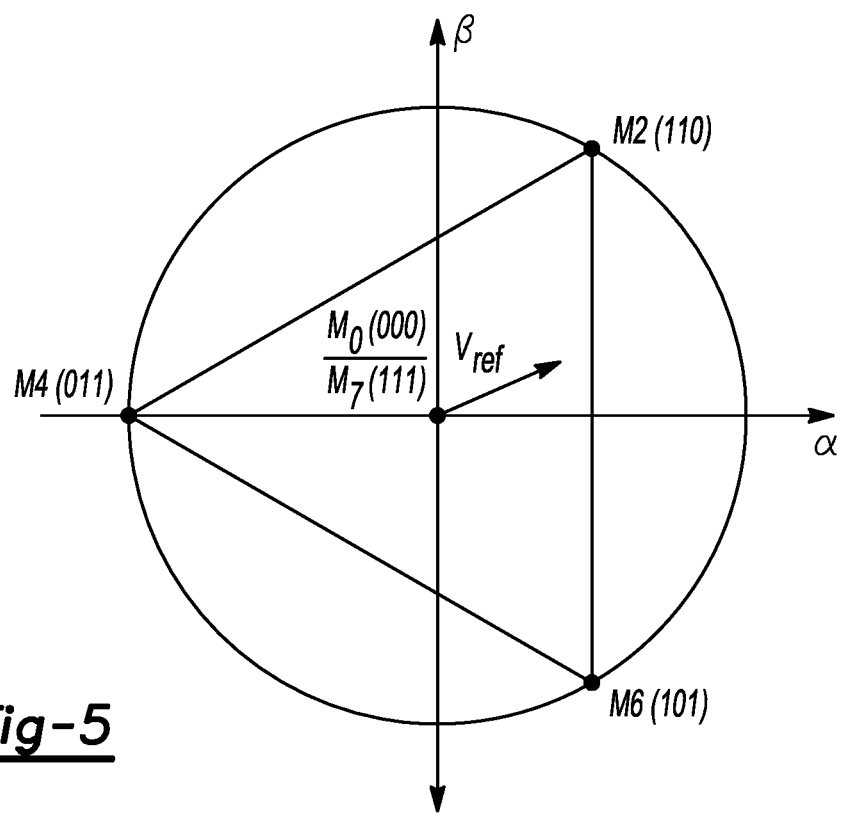
FIG. 5 shows a vector diagram representative of another alternative control mode for an electric motor.

In a variation of the control strategy illustrated in FIG. 4, refer now to FIG. 5. There, a voltage reference vector $V_{ref}$ may be generated using only vector M2, vector M4, and vector M6. Recall from the table above that in each of vector M2, vector M4, and vector M6, the resultant common mode voltage at neutral point 48 is $2 V_{PN}/3$. As such, using only vector M2, vector M4, and vector M6 will reduce or eliminate the time rate of change of the CMV of electric motor 26 and the resulting i=Cdv/dt current associated with the time rate of change of CMV between neutral point 48 and ground 49. It is apparent from FIG. 4 that vector M2, vector M4, and vector M6, nonadjacent non-zero vectors due to the omission of vector M1, vector M3, and vector M5, are being used. In other words, no adjacent non-zero vectors are used.

As noted above, voltage reference vector Vref is a rotating vector. However, in whichever section of the α-β plane Vref is in, Vref may be synthesized using the vector sum of vector M1, vector M3, and vector M5 (in appropriate PWM duty cycle fractions of the three vectors), or by using the vector sum of vector M2, vector M4, and vector M6 (again, in appropriate PWM duty cycle fractions of the three vectors).

Consider also that switching of switching elements 30-35 may induce common-mode voltage on shaft 58 of electric motor 26. One example may be shown in FIG. 6, which illustrates that common mode voltage (CMV) associated with switching of switching elements 30-35 of power inverter module 22 may induce common mode voltage on shaft 58 of electric motor 26. A waveform 80 associated with the switching of switching elements 30-35 may be reflected in a waveform 82 showing voltage $V_{sft}$ measured at shaft 58 of electric motor 26. The induced common mode voltage at shaft 58 may accumulate over time and may become sufficiently large to exceed the breakdown voltage of the oil film in bearing 52. Such induced voltage may travel on a path 72 through bearing 52, representing significant possibility of fretting due to electrical discharge machining (EDM). The current travelling on path 72 may also travel through gear case 70, similarly causing damage.

However, the absolute level of voltage on shaft 58 of electric motor 26 can be measured, such as by using a conductive brush that bears on shaft 58 of electric motor 26. If the voltage level on shaft 58 of electric motor 26 is observed to be increasing, the control strategy shown in FIG. 5 (that is, use of vectors M2, M4, and M6) may be transitioned to the control strategy shown in FIG. 4. (that is, the use of vectors M1, M3, and M5) in order to counteract the accumulation of common mode voltage of the shaft of electric motor 26. The reverse may also be employed (transitioning from the FIG. 4 control strategy to the FIG. 5 control strategy).

The motor control method and system thus described may be useful when electric motor 26 is operating at relatively low or medium speed, where the fullest voltage capacity of power inverter module 22 is not needed.

Refer now to FIG. 7. Here, an alternative inverter is illustrated. Inverter 300 may be connected between two rails $V_{DC}/2$ and $-V_{DC}/2$. Here, inverter 300 includes three legs, leg 302, leg 304, and leg 306 and three phase outputs, output 308, output 310. and output 312, which outputs may be connected to the stator windings of electric motor 26. In the multilevel configuration shown for inverter 300, each of output 308, output 310, and output 312 may assume three different voltages. As an illustration, suppose switching element 320 and switching element 322 and switching element 324 and switching element 326 are OFF. In that case, output 308 assumes the voltage $V_{DC}/2$. If switching element 324 and switching element 326 are ON and switching element 320 and switching element 322 are OFF, output 308 assumes the voltage $-V_{DC}/2$. If switching element 322 and switching element 324 are ON and switching element 320 and switching element 326 are OFF, output 308 assumes the voltage 0V (zero volts).

Figure 8:
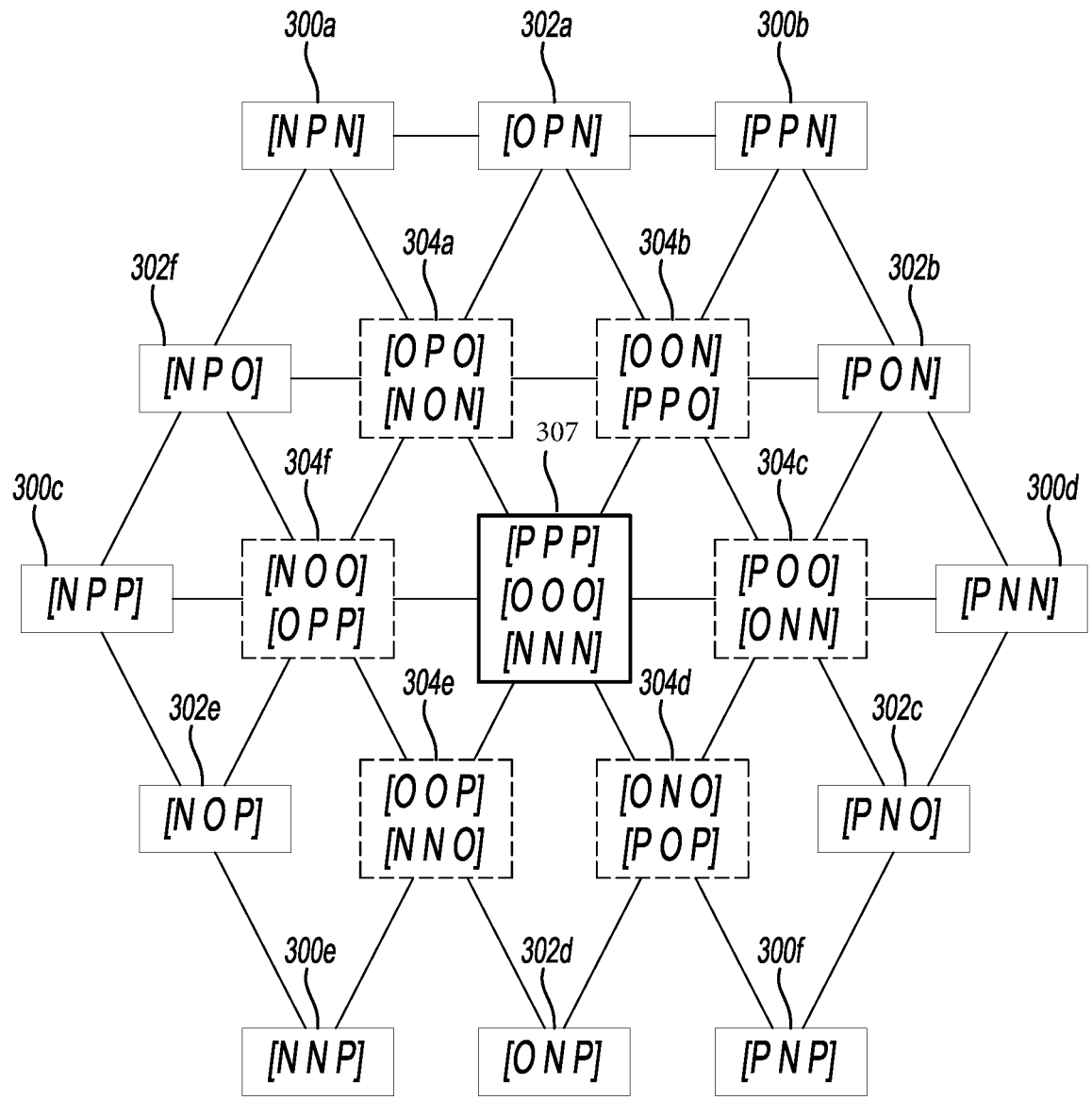
FIG. 8 illustrates vectors for the switching elements of the multi-level inverter of FIG. 7.

The vector diagram for the vectors of inverter 300 is shown in FIG. 8. Here, the voltage applied to electric motor 26 may have 27 vectors, compared to the eight vectors shown in FIG. 3. In each vector shown in FIG. 8, the voltage state ($P=V_{DC}/2$, $N=-V_{DC}/2$, and $O=0V$) is shown. For vector 300*a*, vector 300*b*, vector 300*c* vector 300*d*, vector 300*e*, and vector 300*f*, the resultant voltage at neutral point 48 is $+/-V_{DC}/2$. For vector 302*a*, vector 302*b*, vector 302*c*, vector 302*d*, vector 302*e*, and vector 302*f*, the resultant voltage applied at neutral point 48 is $+/-V_{DC}/3$. For vector 304*a*, vector 304*b*, vector 304*c*, vector 304*d*, vector 304*e*, and vector 304*f*, the resultant voltage at neutral point 48 is $+/-V_{DC}/6$. Finally, for vector 307, the resultant voltage at neutral point 48 is zero volts. It is apparent that FIG. 8 illustrates 24 non-zero vectors.

Figure 9:
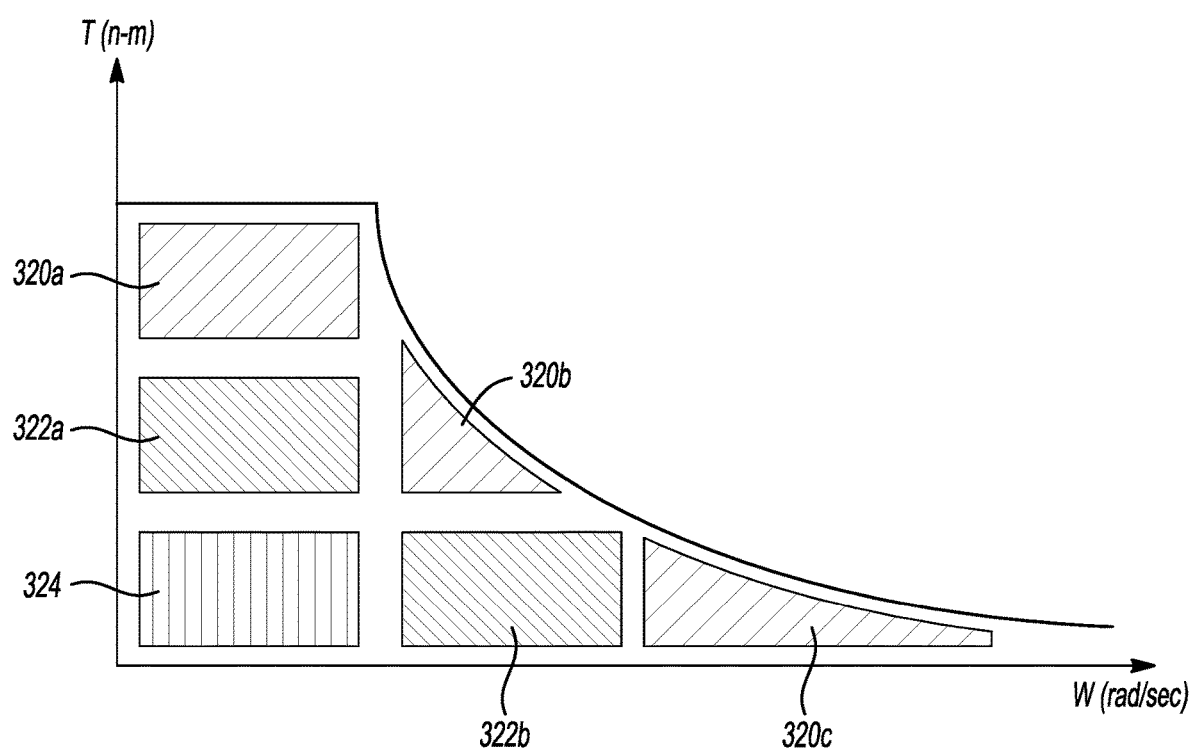
FIG. 9 illustrates an electric motor control strategy using a multi-level inverter, such as the inverter of FIG. 7.

With modulation using inverter 300, operating electric motor 26 in various torque-speed regions of electric motor 26 (illustrated in FIG. 9) may be accomplished with the selection of vectors that result in the same common mode voltage at neutral point 48 of electric motor 26. For instance, operation in region 320*a*, region 320*b*, and region 320*c* may be by selecting vector 300*a*, vector 300*b*, vector 300*c*, vector 300d, vector 300e, and vector 300f, to the exclusion of vectors 302a-302f and vectors 304a-304f. Further, operation in region 322a and 322b may be by selecting vector 304a, vector 304b, vector 304c, vector 304d, vector 304e, and vector 304f. Finally, operation in region 324 may be by selecting vector 302a, vector 302b. vector 302c, vector 302d, vector 302e, and vector 302f.

As a way to enhance voltage available for control of electric motor 26, so-called third-harmonic injection may be used.

The motor control method and system disclosed in this closure may reduce the leakage current in electric motor 26 by reducing the time rate of change of common mode voltage at neutral point 48 of electric motor 26. Additionally, the electrical discharge machining (EDM) current that may damage bearings of electric motor 26 and gears within gear case 70 may be reduced.

The motor control method and system disclosed herein may result in reduced need for a common mode choke that might otherwise be used to suppress common mode currents.

What is claimed is:

1. A method for control of an AC electric motor through a voltage inverter having a plurality of electric switches with on-off states that collectively define a plurality of non-zero vectors angularly disposed about a common origin, the method comprising:
through one or more controllers, calculating a rotating voltage reference vector to apply to the AC electric motor through the voltage inverter;
through one or more controllers, calculating switching times of the voltage inverter using a first subset of the plurality of non-zero vectors, the first subset comprising fewer than all of the plurality of non-zero vectors and comprising no adjacent non-zero vectors, to synthesize the rotating voltage reference vector; and
through the voltage inverter, applying the rotating voltage reference vector to the AC electric motor.

2. The method of claim 1, further comprising:
through one or more controllers, calculating switching times of the voltage inverter using a second subset of the plurality of non-zero vectors, the second subset comprising fewer than all of the plurality of non-zero vectors and comprising no adjacent non-zero vectors, to synthesize the rotating voltage reference vector, wherein the second subset of the plurality of non-zero vectors is different than the first subset of non-zero vectors; and
through the voltage inverter, applying the rotating voltage reference vector to the AC electric motor.

3. The method of claim 2, wherein the first subset of the plurality of non-zero vectors and the second subset of the plurality of non-zero vectors have no common members.

4. A method as recited in claim 2, wherein each non-zero vector in the first subset of the plurality of non-zero vectors results in a first resultant voltage at a neutral point of the AC electric motor.

5. A method as recited in claim 4, wherein each non-zero vector in the second subset of the plurality of non-zero vectors results in a second resultant voltage at the neutral point of the AC electric motor, wherein the first resultant voltage is different than the second resultant voltage.

6. A method as recited in claim 2, comprising changing from using the first subset of non-zero vectors to using the second subset of the plurality of non-zero vectors in response to a voltage of a shaft of a rotor of the AC electric motor.

7. The method of claim 1, wherein:
the AC electric motor is a three-phase electric motor; and
the voltage inverter is an H-bridge two-level voltage inverter with six electric switches and six non-zero vectors.

8. The method of claim 1, wherein the step of applying the rotating voltage reference vector to the AC electric motor comprises applying the voltage reference vector by pulse-width modulation.

9. The method of claim 8, wherein the pulse-width modulation is state vector pulse-width modulation.

10. A method for control of an AC electric motor through a voltage inverter having a plurality of electric switches with on-off states that collectively define a plurality of non-zero basic vectors angularly disposed about a common origin, the method comprising:
through one or more controllers, calculating a rotating state vector to apply to the AC motor through the voltage inverter;
through one or more controllers, controlling switching of the voltage inverter using a first subset of the plurality of non-zero basic vectors, the first subset comprising fewer than all of the plurality of non-zero basic vectors and comprising no adjacent non-zero basic vectors, to synthesize the rotating state vector; and
through the voltage inverter, applying the rotating state vector to the AC electric motor by pulse-width modulation.

11. The method of claim 10, further comprising:
through one or more controllers, controlling switching of the voltage inverter using a second subset of the plurality of non-zero basic vectors, the second subset comprising fewer than all of the plurality of non-zero basic vectors and comprising no adjacent non-zero basic vectors, to synthesize the rotating state vector, wherein the second subset of the plurality of non-zero basic vectors is different than the first subset of non-zero basic vectors; and
through the voltage inverter, applying the rotating state vector to the AC electric motor by pulse-width modulation; wherein
the first subset of the plurality of non-zero vectors and the second subset of the plurality of non-zero vectors have no common members.

12. The method of claim 11, further comprising:
through one or more controllers, calculating voltage inverter switching times using all of the non-zero basic vectors to synthesize the rotating state vector; and
through the voltage inverter, applying the rotating state vector to the AC electric motor by pulse-width modulation; wherein
the first subset of non-zero basic vectors are used in a first AC electric motor operating condition and all of the non-zero basic vectors are used in a second AC electric motor operating condition; and
the first AC electric motor operating condition is a lower motor speed or lower motor torque condition than the second AC electric motor operating condition.

13. The method of claim 11, wherein:
each non-zero vector in the first subset of the plurality of non-zero vectors results in a first resultant voltage at a neutral point of the AC electric motor; and
each non-zero vector in the second subset of the plurality of non-zero vectors results in a second resultant voltage at the neutral point of the AC electric motor; wherein the first resultant voltage is different than the second resultant voltage.

14. The method of claim 11, comprising changing from using the first subset of non-zero vectors to using the second subset of the plurality of non-zero vectors in response to a voltage of a shaft of a rotor of the AC electric motor.

15. A motor vehicle comprising:
a source of stored electrical energy;
an AC electric motor;
a voltage inverter coupled to the source of stored electrical energy and the AC electric motor to provide switched electrical energy from the source of stored electrical energy to the AC electric motor, the voltage inverter having a plurality of electric switches with on-off states that collectively define a plurality of non-zero vectors angularly disposed about a common origin; and
one or more controllers collectively programmed with the following instructions:
calculate a rotating voltage reference vector to apply to the AC electric motor through the voltage inverter;
calculate switching times of the voltage inverter using a first subset of the plurality of non-zero vectors, the first subset comprising fewer than all of the plurality of non-zero vectors and comprising no adjacent non-zero vectors, to synthesize the rotating voltage reference vector; and
through the voltage inverter, apply the rotating voltage reference vector to the AC electric motor.

16. The motor vehicle of claim 15, wherein the one or more controllers are further collectively programmed with the following instructions:
through one or more controllers, calculate switching times of the voltage inverter using a second subset of the plurality of non-zero vectors, the second subset comprising fewer than all of the plurality of non-zero vectors and comprising no adjacent non-zero vectors, to synthesize the rotating voltage reference vector, wherein the second subset of the plurality of non-zero vectors is different than the first subset of non-zero vectors; and
through the voltage inverter, apply the rotating voltage reference vector to the AC electric motor.

17. The motor vehicle of claim 16, wherein the first subset of the plurality of non-zero vectors and the second subset of the plurality of non-zero vectors have no common members.

18. The motor vehicle of claim 17, wherein:
each non-zero vector in the first subset of the plurality of non-zero vectors results in a first resultant voltage at a neutral point of the AC electric motor; and
each non-zero vector in the second subset of the plurality of non-zero vectors results in a second resultant voltage at the neutral point of the AC electric motor, wherein the first resultant voltage is different than the second resultant voltage.

19. The motor vehicle of claim 16, wherein the one or more controllers are further programmed with the instruction to change from using the first subset of non-zero vectors to using the second subset of the plurality of non-zero vectors in response to a voltage of a shaft of a rotor of the AC electric motor.

* * * * *